/ Patented Jan. 6, 1948

2,433,852

UNITED STATES PATENT OFFICE 2,433,852

CONDENSATION PRODUCT AND PREPARATION AND USE THEREOF

Eugene Lieber, West New Brighton, Staten Island, N. Y., assignor to Standard Oil Development Company, a corporation of Delaware No Drawing. Application December 23, 1942, Serial No. 469,895

14 Claims. (Cl. 252—52)

The present invention relates to a novel type of chemical condensation products and to methods of preparing such products and using them for various purposes, more particularly as pour depressors in waxy lubricating oils.

Broadly, the invention comprises the production of condensation products having wax-modifying properties, by chemically condensing a lower saturated aliphatic polyalcohol with an aromatic compound. This condensation is preferably carried out by the use of a Friedel-Crafts catalyst according to the procedure commonly used for effecting such condensations.

The lower saturated aliphatic polyalcohol to be used is one having at least two hydroxyl groups and having a low molecular weight, the number of carbon atoms being less than 10. Although some modified polyalcohols (commonly known as glycols) may be used, it is preferred to use polyalcohols having the following general formulae:

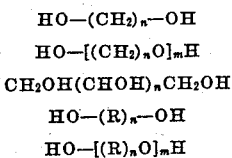

where R is a divalent aliphatic hydrocarbon radical and $m$ and $n$ are integers whose values may be 1 or more but of such value that the total number of carbon atoms do not total more than eight. Specific examples of such polyalcohols include ethylene glycol, glycerol, propylene glycol, diethylene glycol, triethylene glycol, etc., or mixtures of two or more such pure compounds, or commercial products of which such polyalcohols represent the main constituent.

The aromatic compound to be used as the other reactant may be composed of a single aromatic ring or polynuclear compound, and in the latter case the several nuclei may be separate or condensed. Various derivatives of such aromatic compounds may also be used, such as those containing alkyl, hydroxy, amino, and other substituents, or partially hydrogenated aromatic compounds, so long as these various derivatives still contain at least two replaceable hydrogen atoms on the nucleus, or, in other words, so long as they are still subject to Friedel-Crafts condensation. Specific examples of suitable aromatic compounds include benzene, naphthalene, anthracene, phenanthrene, toluene, xylene, amylbenzene, retene, phenol, alpha- or beta-naphthol, cresol, anisole, tertiary amyl phenol, diphenyl and diphenyl oxide.

The Friedel-Crafts catalyst to be used in effecting this condensation of the lower aliphatic polyalcohols with the aromatic compounds, according to this invention, is preferably anhydrous aluminum chloride, although other Friedel-Crafts catalysts can be used, such as boron fluoride, ferric chloride, zinc chloride, and hydrogen fluoride.

The use of an inert diluent or solvent, especially one which is a good solvent for the resulting high molecular weight condensation product, is optional but is preferred, and if used, should be present in about ½ to 10 volumes, preferably 1–5 volumes, per volume of total reactants and catalyst.

Although the proportions of reactants to be used will vary to some extent according to the individual materials used and the reaction conditions used, ordinarily 1–20, preferably 5–15, moles of the polyalcohol should be used, for each mole of aromatic compound used.

In carrying out the invention, the operating conditions to be used should include a temperature between the approximate limits of room temperature and 300° F., preferably mixing the reactants and catalyst at about room temperature and then, after any initial reaction has begun to subside, heating the reaction mixture to a final temperature of about 150–300° F. with a reaction time of about ½ to 10 hours, usually about 1 to 5 hours. The reactants and catalyst can be mixed in any desired order; for instance, the aliphatic polyalcohol and the aromatic compound can be mixed together first with or without solvent and then the catalyst added, or the catalyst may be mixed with the aromatic compound and the aliphatic polyalcohol subsequently added.

After the reactants and the catalyst have been mixed together and after the reaction mixture has been heated to the desired final temperature for a sufficient time to complete the reaction, the reaction mixture is cooled, diluted with a convenient volume of kerosene, light chlorinated hydrocarbon or other suitable diluent, and neutralized by any of the methods familiar to the Friedel-Crafts art, i. e., by adding water, alcohol, dilute aqueous caustic soda solution, etc., a mixture of alcohol and water being very suitable. The reaction mixture is then separated, as by settling, into two layers the aqueous layer containing the aluminous sludge being removed, and the kerosene extract, after washing with water, is then distilled under reduced pressure as with fire and steam or with vacuum (e. g., 5–50 mm. absolute mercury pressure) to a temperature of about 500° or 600° F. to remove solvent and low-boiling products. The distillation residue constitutes the desired condensation product of this invention.

The condensation product of this invention is soluble in mineral lubricating oils and is substantially non-volatile up to about 600° F. under reduced pressure, having a fairly high molecular weight. In most cases, it ranges from a viscous oil to a solid in consistency and generally has a brown or other dark color. The exact chemical structure of this product is not known.

The product of this invention has the property of modifying the crystal structure of waxes such as paraffin wax present when added to compositions containing the same. For instance, when about 0.5–10.0%, preferably 0.2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc., or for making various molded products.

The invention will be better understood from a consideration of the following experimental data which are given for the sake of illustration but without intending to limit the invention to the particular materials or operating conditions used.

For the sake of clearness the procedure used in carrying out the first experiment will be explained in detail, and for convenience and brevity, the kinds and amounts of materials, as well as operating conditions used in the other tests, will be indicated only in the summary table in which all of the test data are given. This table also shows the yield (weight) of product obtained and shows the A. S. T. M. pour point data obtained when the condensation products of this invention are tested in a 2% or 5% concentration in a waxy mineral lubricating oil base stock having a pour point of +30° F.

*Examples*

15 grams of naphthalene and 600 cc. of refined kerosene as solvent were placed in a round-bottom flask equipped with a condenser. After the naphthalene had dissolved, 100 grams of ethylene glycol were added. 50 grams of AlCl₃ were then added with continual shaking every 10 minutes until 200 grams of AlCl₃ had been added. After the addition of the AlCl₃, the reaction mixture was heated to 300° F. and maintained thereat for 2 hours. After cooling, the AlCl₃ was destroyed by the addition of 1,000 cc. of a mixture of isopropyl alcohol and water and diluted with 500 cc. further of kerosene. After separating, the kerosene extract was washed with water and then distilled with fire and steam to 600° F. in order to remove solvent and low boiling products. A bottoms residue comprising 45 grams of a viscous brown oil was obtained as product.

When 2% of this condensation product was added to a waxy oil, the pour point of which was +30° F., the pour point was found to be −5° F.

The following table summarizes the data on this and 13 other tests. Except where otherwise indicated, in all of these tests, 100 grams of the polyalcohol and 15 grams of the aromatic compound were used; also, 600 cc. of refined kerosene was used as solvent, 200 grams of AlCl₃ as catalyst, and the reaction temperature was 300° F.; the procedure described above in detail for the first test was used for all the others except in tests 2, 3 and 4 as indicated.

*Condensation of polyalcohols with aromatic compounds*

| Test No. | Reagents | | Reaction Time, Hrs. | Gms. Yield | ° F. Pour Test | | See Note |
|---|---|---|---|---|---|---|---|
| | Polyalcohol | Aromatic Compound | | | 2.0% | 5.0% | |
| 1 | Ethylene Glycol | Naphthalene | 2 | 45 | −5 | −15 | |
| 2 | ----do---- | ----do---- | 2 | 25 | −25 | −25 | (1) |
| 3 | ----do---- | ----do---- | 2½ | 28 | −15 | −25 | (2) |
| 4 | ----do---- | ----do---- | 2½ | 27 | −20 | −30 | (3) |
| 5 | Glycerol | ----do---- | 3½ | 45 | −10 | −25 | |
| 6 | Propylene Glycol | ----do---- | 3½ | 52 | −15 | −20 | |
| 7 | Triethylene Glycol | ----do---- | 2½ | 20 | −15 | −25 | |
| 8 | Ethylene Glycol | ----do---- | 2½ | 46 | 0 | −15 | (4) |
| 9 | ----do---- | Benzene | 1 | 21 | −10 | −20 | |
| 10 | ----do---- | Diphenyl | 2½ | 24 | −10 | −25 | |
| 11 | ----do---- | Diphenyl Ether | 3 | 49 | +10 | −5 | |
| 12 | ----do---- | Diphenylene Oxide | 3½ | 34 | −10 | −20 | |
| 13 | ----do---- | Phenol | ½ | 45 | +15 | +5 | |
| 14 | ----do---- | Aniline | 2½ | 33 | +5 | −15 | |

NOTES:
1 Naphthalene added last to a mixture of Polyalcohol+AlCl₃ and 800 cc. of solvent.
2 Slurry of naphthalene+AlCl₃ in kerosene added last to the polyalcohol suspended in kerosene.
3 Polyalcohol added last to a mixture of aromatic+AlCl₃.
4 45 grams of naphthalene were used.

It is thus noted from the data in the above table that good pour depressors can be made from raw materials which had not heretofore been suspected of being capable of reacting to produce pour depressors. The addition of 2% of the condensation product of this invention to a waxy mineral lubricating oil having a pour point of +30° F. lowers the pour point to 15° F., 0° F., and even to as low as −25° F.

In the appended claims, the expression "aluminum chloride condensation product" is intended to mean a condensation product made in the presence of aluminum chloride as catalyst.

It is not intended that this invention be limited to any of the specific examples which were given merely for the sake of illustration, but only by the appended claims in which it is intended to claim all novelty inherent in the invention as well as all modifications coming within the scope and spirit of the invention.

I claim:

1. The process which comprises condensing about 5 to 20 moles of a lower saturated alkylene glycol having less than 10 carbon atoms and having at least as many carbon atoms as oxygen atoms, with 1 mole of a condensable aromatic hydrocarbon of 6 to 12 carbon atoms in the presence of about 200 parts by weight of aluminum chloride as catalyst per 100 parts by weight of poly-alcohol, and in the presence of about 1 to 10 volumes of an inert solvent per volume of total reactants, at a temperature between the approximate limits of room temperature and about 300° F., using a final reaction temperature of about 150 to 300° F., hydrolyzing and removing the catalyst and distilling the condensation products under reduced pressure up to about 600° F. to obtain the desired product as distillation residue.

2. The process which comprises condensing at least about 5 mols of ethylene glycol with one mol of naphthalene in the presence of aluminum chloride, hydrolyzing and removing the aluminum chloride, and distilling the condensation products under reduced pressure to obtain the desired product as distillation residue.

3. A high molecular weight, oil soluble, viscous to solid aluminum chloride condensation product of about 10 to 15 moles of ethylene glycol with about 1 mole of naphtalene, said condensation product being substantially non-volatile up to about 600° F. under reduced pressure, and having wax modifying properties.

4. Product of the process defined in claim 1.

5. Lubricant comprising a major proportion of a waxy mineral lubricating oil having dissolved therein a pour depressing amount of about 0.2% to 5% of a high molecular weight viscous to solid oil-soluble aluminum chloride condensation product of at least 5 mols of a lower saturated glycol selected from the class consisting of alkylene and polyalkylene glycols having less than 10 carbon atoms and having at least as many carbon atoms as oxygen atoms, with one mol of an aromatic hydrocarbon compound having not more than 3 rings and containing at least 2 replaceable hydrogen atoms on the nucleus, said condensation product being substantially non-volatile up to about 600° F. under reduced pressure.

6. Lubricant according to claim 5 in which the aromatic compound referred to is a poly-nuclear aromatic hydrocarbon.

7. Lubricant according to claim 5 in which the aromatic compound referred to is naphthalene.

8. Lubricant comprising a major proportion of a waxy mineral lubricating oil containing dissolved therein a pour depressing amount of an aluminum chloride condensation product of at least about 5 mols of ethylene glycol with 1 mol of naphthalene, said condensation product being oil soluble and substantially non-volatile up to about 600° F. under reduced pressure.

9. Lubricants comprising a major proportion of a waxy mineral lubricating oil containing dissolved therein a pour-depressing amount of a high molecular weight oil-soluble condensation product of about 10 to 15 mols of ethylene glycol with 1 mol of naphthalene, said condensation product having been condensed in the presence of about 200 parts by weight of aluminum chloride as catalyst per 100 parts by weight of ethylene glycol, and said condensation product being substantially non-volatile up to about 600° F. under reduced pressure.

10. The process which comprises condensing at least about 5 mols of a lower saturated glycol selected from the class consisting of alkylene and polyalkylene glycols having less than 10 carbon atoms and having at least as many carbon atoms as oxygen atoms, with one mol of an aromatic hydrocarbon compound having not more than 3 rings and containing at least 2 replaceable hydrogen atoms on the nucleus, in the presence of aluminum chloride as catalyst, at a temperature between the approximate limits of room temperature and about 300° F., using a final reaction temperature of about 150–300° F., to produce a high molecular weight oil-soluble condensation product non-volatile up to about 600° F. under reduced pressure, hydrolyzing and removing the catalyst, and distilling the condensation products under reduced pressure up to about 600° F. to obtain the desired product as distillation residue.

11. Process according to claim 10 in which the glycol used is an alkylene glycol of 2 to 3 carbon atoms and the aromatic compound used is a hydrocarbon of 6 to 12 carbon atoms.

12. The process which comprises condensing about 10 to 15 mols of ethylene glycol with about one mol of naphthalene in the presence of about 1 to 10 volumes of a refined kerosene as inert solvent per volume of total reactants, and in the presence of about 200 parts by weight of aluminum chloride as catalyst per 100 parts by weight of glycol, at a temperature between the approximate limits of room temperature and about 350° F., hydrolyzing and removing the catalyst and distilling the condensation products under reduced pressure up to about 600° F. to obtain the desired product as distillation residue.

13. Product consisting essentially of a high molecular weight viscous to solid oil-soluble aluminum chloride condensation product of at least 5 mols of a lower unsaturated glycol selected from the class consisting of alkylene and poly-alkylene glycols having less than 10 carbon atoms and having at least as many carbon atoms as oxygen atoms, with one mol of an aromatic hydrocarbon compound having not more than 3 rings and containing at least 2 replaceable hydrogen atoms on the nucleus, said condensation product being substantially non-volatile up to 600° F. under reduced pressure.

14. Product according to claim 13 being a condensation product of an alkylene glycol of 2 to 3 carbon atoms and an aromatic hydrocarbon of 6 to 12 carbon atoms.

EUGENE LIEBER.

REFERENCES CITED

The following references are of record in the file of this patent:

UNITED STATES PATENTS

| Number | Name | Date |
| --- | --- | --- |
| 2,111,126 | Rabe | Mar. 15, 1938 |
| 2,239,515 | Bartlett | Apr. 22, 1941 |
| 2,273,100 | Gleason | Feb. 17, 1942 |
| 2,147,547 | Reiff | Feb. 14, 1939 |
| 2,244,886 | Lincoln | Jan. 10, 1941 |
| 2,250,265 | Kapp | July 22, 1941 |
| 2,125,968 | Theimer | Aug. 9, 1938 |
| 2,198,374 | Bruson | Apr. 23, 1940 |
| 2,213,477 | Steindorff | Sept. 3, 1940 |
| 2,307,885 | Gleason | Jan. 12, 1943 |

OTHER REFERENCES

Chem. Abstracts, vol. 31, page 7860 (November 10, 1937).